July 3, 1951 L. L. POURCIAU 2,559,515

HIGH-FIDELITY AMPLIFIER

Filed July 1, 1947

Inventor
LOUIS L. POURCIAU
By J. B. Boyer
H. S. Mackey
Attorneys

Patented July 3, 1951

2,559,515

UNITED STATES PATENT OFFICE 2,559,515

HIGH-FIDELITY AMPLIFIER

Louis L. Pourciau, Pleasantville, N. Y., assignor to General Precision Laboratory Incorporated, a corporation of New York Application July 1, 1947, Serial No. 758,350

4 Claims. (Cl. 179—171)

This invention relates to a high fidelity amplifier so designed that it may be connected to a high impedance signal source thru any reasonable length of cable without suffering the usual accompanying loss in high frequency response.

Frequently it is desirable to locate an amplifier at a point some distance from a high impedance source of signals. In such cases the signals generated by the source and which are to be amplified, must be transmitted to the amplifier thru a shielded cable. Such a cable has a certain inherent capacity existing between the conductor and the shield and this capacity increases in direct proportion to an increase in the length of the cable. Such a capacity has a greater admittance for signals of the higher frequencies than for those of the lower frequencies and has the effect, therefore, of reducing the proportionate amount of high frequency signals available at the input of the amplifier. The greater the length of cable existing between the signal source and the amplifier input, the greater the proportionate loss of high frequency signals and hence the poorer the response of the system as a whole.

The present invention has for its purpose the correction of these defects and the provision of means whereby high fidelity of response is obtained regardless of the length of the cable which may be used to connect the signal source to the amplifier.

According to the present invention the effective capacity existing between the conductor and the cable shield is first minimized so that its effect in reducing the high frequency response of the system is considerably diminished and improved results obtained. To this end a so-called "cathode follower" connected in a negative or inverse feedback loop, is used as the amplifier input having the grid thereof connected to the cable conductor and the cathode thereof connected to the cable shield.

By using a negative or inverse feedback loop which may have a very high gain the action of the circuit is made to approach the ideal for cathode follower circuits having an infinite load resistance and the cable shield is made to closely approximate the cable conductor in potential with a consequent decrease in the effective capacity existing between these elements. This results in a reduction in the proportionate amount of high frequency signals which are bypassed before reaching the amplifier input and hence more of such signals are available for amplification, resulting in a higher fidelity of response.

So much of the invention minimizes the deleterious effects ordinarily resulting from the capacity inherent in the cable and to that extent produces improved results. Such a system alone, however, cannot totally correct for the losses in high frequency responses naturally resulting from cable capacity.

In order that the adverse effects of cable capacity on high frequency response may be completely avoided and high fidelity of response obtained, particularly in those cases where relatively long lengths of cable are employed, the present invention contemplates the use of an additional shield on the cable and the utilization of the capacity existing between this shield and the first shield to increase the gain of the amplifier, in proportion to the value of that capacity, at those higher frequencies which are normally present at the input of the amplifier in decreased amounts because of the capacity existing between the cable conductor and first shield.

By this means, the present invention, makes the cable itself a primary factor in compensating for the normal losses at the higher frequencies and it may be said in a sense to be self-correcting. That is to say, as the cable connecting the signal source and the amplifier is increased in length thereby resulting in an increase in inherent capacity thereof which would normally reduce the proportionate amount of signals of the higher frequencies which are impressed on the amplifier input, there is an accompanying and proportionate increase in the compensating capacity between the two shields which is made to increase the gain of the amplifier at these same high frequencies thereby compensating for their initial loss in input.

While in accordance with the present invention, the circuit constants may be so proportioned that a decrease in high frequency signal input may be exactly offset by a proportionate gain in amplification at these high frequencies, thereby resulting in a uniform response of amplifier output regardless of the length of cable connecting the signal source and the amplifier, it is also contemplated that the circuit constants may be so proportioned that the system may be overcompensated if desired so that the output at the high frequencies may actually increase as the length of the cable is increased.

The exact nature of the invention will more clearly be understood from reference to the following detailed description taken together with the drawings in which.

Figures 1, 2:
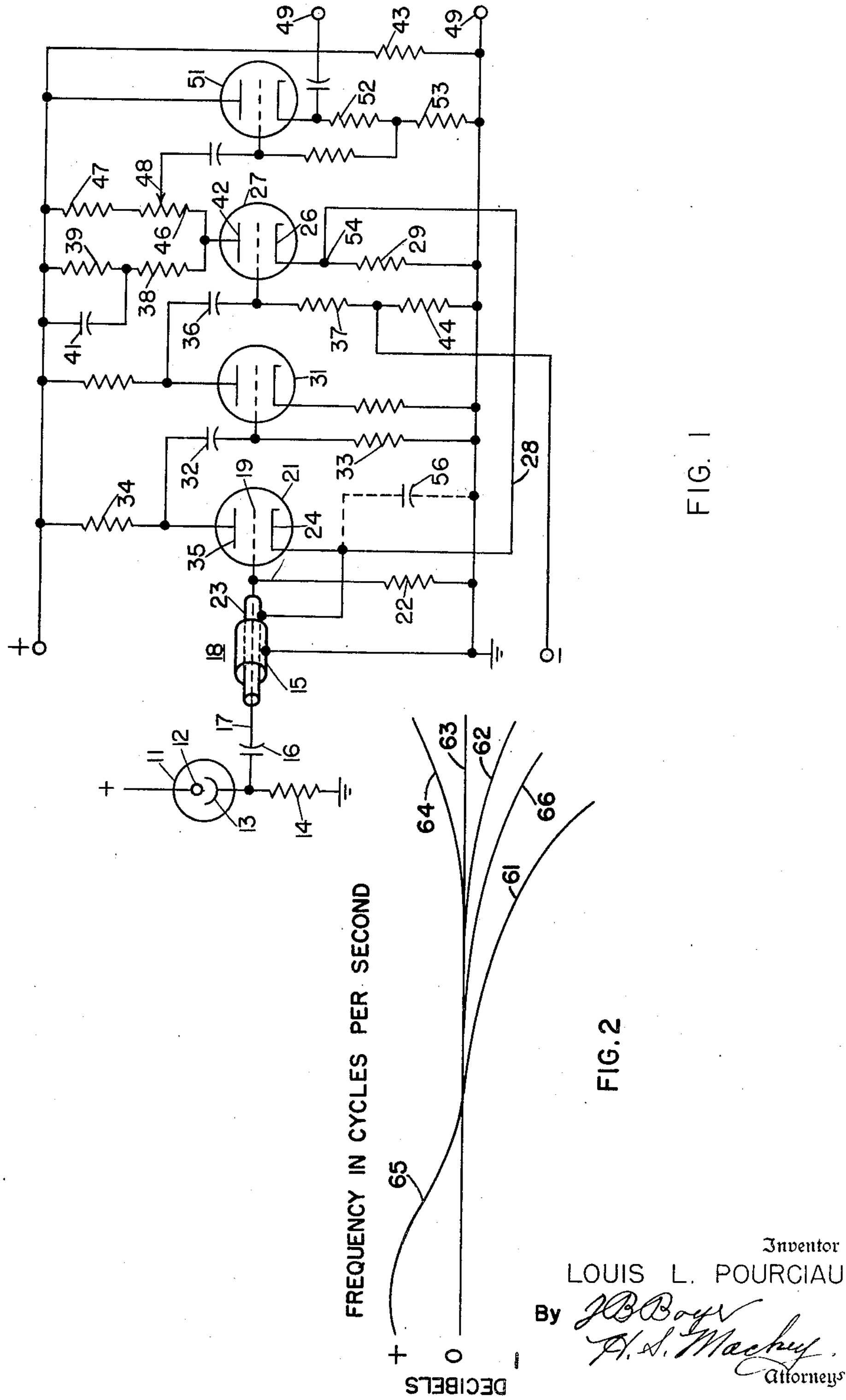
Fig. 1 is a schematic diagram of a circuit embodying the high fidelity amplifier and cable compensating arrangement contemplated by the invention.
Fig. 2 is an illustration of the various response curves which may be obtained by suitable adjustment of the circuit constants of the arrangement of this invention as compared to the response curves obtained when using arrangements old in the art.

Referring now to Fig. 1 a source of signals represented by the photocell 11 has its anode 12 connected to a source of positive potential and its cathode 13 connected to ground thru a high resistance 14.

The signal potentials developed across resistance 14 by the operation of photocell 11 are applied to the grid 19 of thermionic tube 21 thru a blocking condenser 16 and inner conductor 17 of a double shielded cable 18, the output end of which is terminated in a resistance 22.

The inner shield 23 of the cable 18 is connected to the cathode 24 of the tube 21 and cathode 24 is directly connected by conductor 28 to the cathode 26 of thermionic tube 27 and in turn to ground thru a relatively high resistance 29 for the purposes more fully explained hereinafter.

The signal energy impressed on the input of tube 21 produces a variation in the plate current thereof proportional to the signal energy and this variable plate current flowing thru the resistance 29 connected in the cathode circuit of tube 21 and resistance 34 connected in the anode circuit thereof produces variable potential drops in each which are proportional to the product of the plate current and the values of the respective impedances.

A variable signal potential may therefore be obtained from either the potential drop across cathode impedance 29 or anode impedance 34. In the present invention, for reasons as will appear later, it is found to be particularly advantageous to derive the signal potential from the drop across the impedance in the anode circuit and to this end the input of tube 31 is connected to the anode 35 of tube 21 by means of a coupling network consisting of condenser 32 and resistance 33.

The signal potential so impressed on the input of tube 31 is amplified thereby and the amplified signal is impressed on the input of tube 27 thru a similar coupling network consisting of condenser 36 and resistance 37. The signal is further amplified by tube 27 and a variable plate current proportional to the amplified signal is caused to flow in the anode circuit of this tube. This plate circuit includes resistance 29 connected between the cathode 26 and ground and the impedance network, consisting of serially connected resistances 38 and 39 the latter shunted by condenser 41, connected between the anode 42 and the positive terminal of a source of direct current potential, diagrammatically illustrated by the potential divider consisting of resistances 43 and 44.

The amplified signal is derived from this anode circuit thru a gain control circuit consisting of a potentiometer 46 and limiting resistance 47 connected in parallel to the impedance network consisting of resistances 38 and 39 and condenser 41.

The amplified signal potential available at the variable contact 48 of the gain control potentiometer 46 is preferably although not necessarily transmitted to the output circuit 49 thru the medium of a cathode follower 51. A cathode follower output is used in the present instance since it permits the terminal impedance of the amplifier circuit to be readily matched with a relatively low impedance output circut. That is to say, the impedance represented by the cathode follower 51 may be made relatively low as compared with the impedance in the anode circuit of the tube 27 so that the impedance looking into the amplifier output may be made to closely approximate that of the output circuit 49.

The operation of this circuit is as follows:

A varying signal potential derived by operation of the photocell 11 is transmitted to the grid 19 of the tube 21 thru the internal conductor 17 of the double shielded cable 18. A certain amount of capacity exists between the inner conductor 17 and the inner shield 23 of the cable 18 which is directly proportional to the length of the cable and the admittance thereof increases as the frequency of the signal transmitted thru the cable 18 increases. This results in a bypassing of more and more of the signal energy as the frequency thereof increases and if the entire potential of the signal is impressed between the conductor 17 and inner shield 23 as has formerly been done, a very poor frequency response characteristic as indicated by curve 61 of Fig. 2 is obtained.

As is apparent from this curve the level of the signal is maintained for the low frequencies but drops sharply at the higher frequencies which results in loss of definition and tonal quality when audible frequencies are involved.

In the circuit of the present invention the loss of high frequency input is greatly reduced by greatly reducing the potential difference between the conductor 17 and inner shield 23. The cathode 24 of tube 21 is connected to the cathode 26 of tube 27 thru conductor 28 and thence to ground thru a relatively high resistance 29, for example, of the order of 1000 ohms. By such a circuit arrangement the plate current of both tubes 21 and 27 flows thru resistance 29 which also constitutes a portion of the input circuit of tube 21 and hence there is provided a negative or inverse feedback loop. Any increase in signal impressed on the input of tube 21 results in an increase in plate current of this tube and by reason of the amplifying action of the various stages a proportionally greater increase in the plate current of tube 27. The potential drop across resistance 29 is therefore increased by reason of these increases in plate current and the potential of terminal 54 and hence cathode 24 is caused to increase in a positive direction. Any increase of signal potential therefore which has a tendency to raise the potential of grid 19 has the effect of likewise raising the potential of cathode 24 in the same direction thru the action of tubes 21 and 27 and the common cathode resistance 29 and the potential of the cathode 24 at all times closely approaches that of the grid 19. One advantage realized in using this circuit rather than a simple cathode follower is that the inverse feedback loop, which may have a very high gain, provides an effective infinite cathode load resistance for the first stage. Hence, the potential of the cathode 24 is determined only by the amplification factor ($\mu$) of the tube 21, and approaches the ideal predicted for a cathode follower with an infinite load resistance which is $$\left(\frac{\mu}{\mu+1}\right)$$

times the signal on the grid 19.

For example, in a circuit of the type disclosed in Fig. 1 wherein the tube 21 has a $\mu$ of approximately 100 the potential difference between the grid 19 and cathode 24 and hence conductor 17 and inner shield 23 has been found to be reduced to approximately 1% of what it would be in the usual circuit as heretofore used in the art.

Since the potential difference between conductor 17 and inner shield is greatly reduced, the effect of the capacity between these two elements on the input signal is likewise greatly reduced. That is to say, a marked decrease in the effective capacity which tends to bypass the signals of the higher frequencies results in a reduction in the amount of the energy so bypassed and more is available at the input of the amplifier to be amplified and converted to useful energy.

Utilizing only so much of the circuit of this invention results in a considerable improvement in response of the system and response curve such as that of 62 of Fig. 2 is obtained. This curve as compared with that of 61 indicates that a greater frequency range is amplified without loss and that there is a proportionately smaller loss at the higher frequencies.

Nevertheless, despite the improvement in performance some loss at high frequencies remains. Without added corrective measures this loss is unavoidable since despite the great reduction in potential across the shunting capacity of the input cable, some potential difference cannot be entirely avoided and there is always some signal bypassed at the high frequencies, a greater proportion being bypassed the greater the cable capacity, i. e., the greater its length.

The present invention, however, provides such added corrective measures that not only may the losses at the higher frequencies be eliminated but the cable itself, which is ordinarily the cause of such losses, acts as a major corrective element.

This result is accomplished by providing the cable 18 with an additional outer shield 15 connected to ground so that the capacity existing between this shield and the internal shield 23 is connected in parallel to the common cathode resistance 29. This capacity, therefore, taken together with the resistance 29 is in a negative or inverse feedback loop obtained by connecting the cathode output circuits of tubes 21 and 27 to the input tube 21 thru the conductor 28 and the gain of the amplifier is inversely proportional to the impedance of this circuit, or stated another way, the gain from the input of tube 21 to the anode output circuit of tube 27 is equal to the impedance connected between the anode thereof and the positive terminal of the supply source divided by the impedance which is common to the cathode circuits of tubes 21 and 27. This common cathode impedance as aforestated, consists of resistance 29 and the capacity of the cable 18 which exists between the inner shield 23 and outer shield 15 and hence since it includes a capacitive reactance is not constant for all signal frequencies but decreases in impedance as the signal frequency increases. There will be, therefore, less negative or inverse feedback at the higher frequencies and hence a higher gain in the amplifier at these frequencies and the proportionate amount of gain will vary directly as the capacity, i. e., cable length, increases.

The cable capacity, therefore, while unavoidably acting to decrease the amount of signal input at the higher frequencies is made to compensate for this loss in the instant invention by being also utilized to increase the gain of the amplifier at these same high frequencies and since the capacity which occasions the loss and the capacity which acts to increase the gain are both directly dependent on the cable length, the two effects may be made to compensate exactly regardless of cable length. Thus regardless of the length of cable connecting the signal source to the amplifier input, a uniform response over the entire frequency range as indicated by the straight line 63 of Fig. 2 may be obtained. Additionally if desired, a small condenser 56 may be connected across the resistance 29 to properly adjust the circuit constants of the system, if need be, and also to so increase the capacitive reactance of the negative feedback loop that an actual increase in output is had at the higher frequencies as indicated by the curve 64 of Fig. 2.

Likewise if desired an increase in the output level of the low frequencies may be obtained to compensate for the reduced sensitivity of the ear to these frequencies. To this end the condenser 41 is connected in parallel to the resistance 39 in the anode circuit of tube 27. Inasmuch as this anode circuit includes a network the impedance of which increases with decrease in frequency by reason of the capacitive reactance thereof, the overall gain of the amplifier will be increased at these low frequencies since, as heretofore stated, the gain of the amplifier is equal to the impedance in the anode circuit divided by the impedance in the common cathode circuit. By this circuit arrangement a response curve such as 65 of Fig. 2 having an increased output in the low frequency range, is obtained.

Some distance back it was stated that it was particularly advantageous to derive the input for the second stage from the impedance in the anode circuit of the first stage rather than the impedance in the cathode circuit. This statement may now be examined in greater detail. The signal potential which is derived from any particular point is the product of the signal current and the value of the impedance thru which the signal current flows. Considering the first stage of the amplifier, namely, tube 21, the signal current is the same whether the input for tube 31 is connected to the anode 36 or cathode 24 since it is the plate current flowing in this tube. The impedances, however, may be and are quite different and hence the signal potential is likewise quite different. If the input of tube 31 were connected to the cathode 24 of tube 21, the impedance from which the signal is derived, is made up of the resistance 29, the capacity existing in the cable between outer shield 15 and inner shield 23 and the capacity of condenser 56, if it is used. This impedance includes a capacitive reactance and hence is variable with frequency, decreasing as the frequency increases. If the input of tube 31 is derived from this impedance, therefore, the amount of signal energy transferred from the output of tube 21 to the input of tube 31 will decrease at the higher frequencies and an overall response of the amplifier will be represented by the curve 66 of Fig. 2 wherein a loss at high frequencies will occur.

On the other hand when the input of tube 31 is connected to anode 35 of tube 21 the impedance from which the signal energy is derived consists only of resistance 34. Since this impedance is a pure resistance there is no variation in the value thereof with variation in frequency and hence there is no loss in signal energy at any frequency in the transfer thereof from tube 21 to tube 31.

While the use of the impedance in the anode circuit of tube 21 as the output thereof has some tendency to decrease the effective input impedance of this tube as the cathode thereof fails to follow the grid potential as closely as it otherwise might, this tendency is corrected in the instant arrangement by amplifying the signal in stages 31 and 27 and utilizing this amplified signal as well as the plate current of tube 21 to drive the cathode 24.

While for convenience of description the novel amplifier has been illustrated and described as connected to a photocell as a signal source, it will be readily apparent that its use is not limited to such a restricted combination and that it is equally adapted for use with other devices such as microphones and other instrumentalities that must of necessity be located at points remote from these associated amplifying means and hence must be connected thereto thru relatively long cables.

What is claimed is:

1. An amplifier system comprising a source of signal frequencies, an amplifier for amplifying said signal frequencies, a cable connected between said source and said amplifier having an internal conductor, an inner shield and an outer shield, said amplifier including first and second thermionic tubes each having at least an anode, cathode and control electrode, a common cathode circuit for said first and second thermionic tubes including a resistance connected between a common cathode terminal and ground, a connection between said inner cable shield and said common cathode terminal whereby said inner shield is caused to follow substantially the potential of said inner conductor, a connection between said internal conductor and the control electrode of said first thermionic tube, a phase-inverting coupling circuit connected between the anode of said first thermionic tube and the input of said second thermionic tube, a connection between said outer cable shield and ground whereby the capacity between said inner and outer cable shield is connected in shunt to said common cathode resistance and an output impedance connected in the anode circuit of said second thermionic tube.

2. An amplifier system comprising a source of signal frequencies, an amplifier for amplifying said signal frequencies, a cable connected between said source and said amplifier having an internal conductor, an inner shield and an outer shield, said amplifier including first, second and third thermionic tubes each having at least an anode, cathode and control electrode, a connection between said internal conductor and the control electrode of said first thermionic tube, a signal coupling circuit connected between the anode of said first thermionic tube and the control electrode of said second thermionic tube, a common cathode circuit for said first and third thermionic tubes including a resistor connected between a common cathode terminal and ground, a connection between said inner cable shield and said common cathode terminal whereby said inner shield is caused to follow at least approximately the potential of said internal conductor, a connection between said outer cable shield and ground whereby the capacity between said inner and outer cable shields is connected in shunt to said common cathode resistance, and an output impedance connected in the anode circuit of said third thermionic tube.

3. An amplifier system comprising a source of signal frequencies, an amplifier for amplifying said signal frequencies, a cable connected between said source and said amplifier having an internal conductor, an inner shield and outer shield, said amplifier including first and second thermionic tubes each having at least an anode, cathode and control electrode, a common cathode circuit for said first and second thermionic tubes including a resistance connected between a common cathode terminal and ground, a connection between said inner shield and said common cathode terminal whereby said inner shield is caused to follow at least approximately the potential of said internal conductor, a connection between said internal conductor and the control electrode of said first thermionic tube, a connection between said outer shield and ground, and a phase-inverting coupling circuit connected between the anode of said first thermionic tube and the input of said second thermionic tube.

4. An amplifier system comprising a source of signal frequencies, an amplifier for amplifying said signal frequencies having an input lead having capacity to ground, an electrostatic shield between said lead and ground, a second electrostatic shield surrounding said first shield, said amplifier including first and second thermionic tubes each having at least an anode, cathode and control electrode, a common cathode circuit for said first and second tubes including a resistance connected between a common cathode terminal and ground, a phase-inverting coupling circuit between the anode of said first tube and the input circuit of said second tube, a connection between said first shield and said common cathode terminal whereby said first electrostatic shield is caused to follow at least approximately the potential of said lead, a connection between said second shield and ground, whereby the potential of said input lead and said inner shield are maintained at substantially the same relative value but are varied in unison with respect to ground, the varying potential difference of the elements with respect to ground controlling the amplification of the incoming signal.

LOUIS L. POURCIAU.

REFERENCES CITED

The following references are of record in the file of this patent:

UNITED STATES PATENTS

| Number | Name | Date |
|---|---|---|
| 2,175,366 | Shetzline | Oct. 10, 1939 |
| 2,270,012 | Shepard | Jan. 13, 1942 |
| 2,282,319 | Brown | May 12, 1942 |
| 2,458,632 | Parsons | Jan. 11, 1949 |
| 2,489,272 | Daniels | Nov. 29, 1949 |

OTHER REFERENCES

"Electronics," February 1945, page 125.